United States Patent [19]

Baukal, Jr. et al.

[11] Patent Number: 5,611,683
[45] Date of Patent: Mar. 18, 1997

[54] METHOD AND APPARATUS FOR REDUCING NOX PRODUCTION DURING AIR-OXYGEN-FUEL COMBUSTION

[75] Inventors: Charles E. Baukal, Jr., Harleysville; Aleksandar G. Slavejkov, Allentown; Louis W. Monroig, Myerstown, all of Pa.

[73] Assignee: Air Products and Chemicals, Inc., Allentown, Pa.

[21] Appl. No.: 511,211

[22] Filed: Aug. 4, 1995

[51] Int. Cl.⁶ ........................................ F23M 3/04
[52] U.S. Cl. .................. 431/10; 431/181; 431/187; 239/422; 239/423
[58] Field of Search ..................... 431/10, 181, 187; 239/422, 423

[56] References Cited

U.S. PATENT DOCUMENTS

| | | | |
|---|---|---|---|
| 4,622,007 | 11/1986 | Gitman | 431/181 |
| 4,797,087 | 1/1989 | Gitman | 431/10 |
| 5,217,363 | 6/1993 | Brais et al. | 431/186 |
| 5,308,239 | 5/1994 | Bazarian et al. | 431/10 |

Primary Examiner—Carroll B. Dority
Attorney, Agent, or Firm—Robert J. Wolff

[57] ABSTRACT

Method and apparatus for reducing NOX production in an air-oxygen-fuel combustion process by creating post mix oxy-fuel flame and introducing air around said oxy-fuel flame at an angle of greater than 0° to 90° to the longitudinal axis of the oxy-fuel flame.

10 Claims, 9 Drawing Sheets

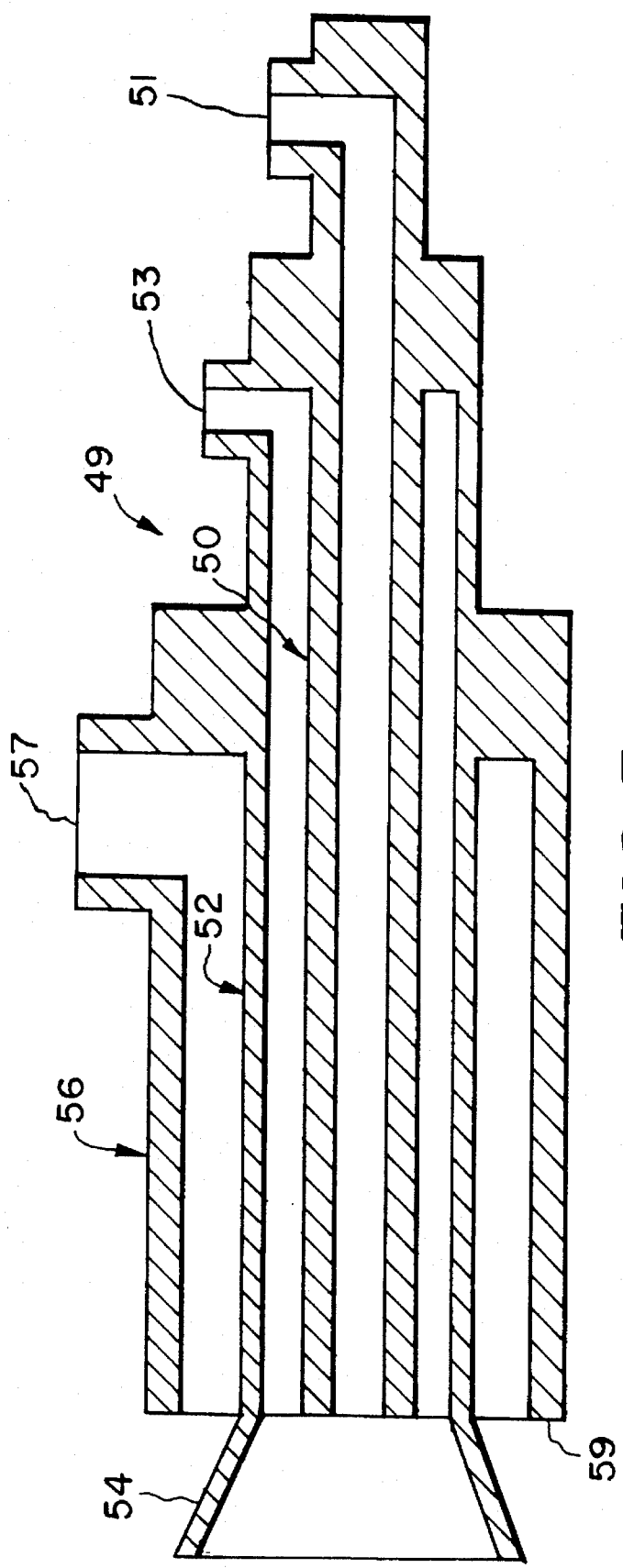

METHOD AND APPARATUS FOR REDUCING NOX PRODUCTION DURING AIR-OXYGEN-FUEL COMBUSTION

FIELD OF THE INVENTION

The present invention pertains to air-oxygen-fuel combustion processes.

BACKGROUND OF THE INVENTION

Most of the combustion processes used in industry use air as an oxidizer to combust a fuel such as natural gas, fuel oil, propane, waste oils, other hydrocarbons and the like. Performance of many air-fuel combustion processes can be improved by enriching the combustion air with oxygen. Enrichment of the combustion air increases both the flame temperature and the thermal efficiency while the flue gas volume decreases as the oxygen concentration in the oxidizer increases. Increased costs due to the use of high purity oxygen for enrichment can be offset by gains in productivity from enhanced combustion. Low level enrichment of up to 35% total oxygen content in the oxidizer can generally be applied to existing air-fuel systems with only a few modifications to the system.

Low level oxygen enrichment in combustion can cause dramatic increases in NOX emissions. Under the U.S. Clean Air Act, there are regulations, if not incentives, for controlling the NOX formations as a result of combusting air-fuel mixtures in the presence of oxygen. Most industrial combustion processes producing NOX emissions result in over 90% of the NOX emissions being in the form of nitric oxide or NO. It is known that high levels of oxygen enrichment, e.g. above 90% total oxygen content in the oxidizer, produce less NOX than using air at the same firing rate. However, high levels of oxygen enrichment can be uneconomical for a given process and in fact may lead to problems with equipment.

U.S. Pat. No. 5,308,239 discloses and claims a method for reducing NOX production during air-fuel combustion processes utilizing oxygen enrichment.

U.S. Pat. No. 5,217,363 discloses and claims a method and apparatus for using air-oxygen techniques for combustion of hydrocarbon fuels wherein the air is primarily used to cool the burner during firing.

U.S. Pat. No. 4,797,087 discloses and claims a method and apparatus for using air-oxygen techniques for combustion of hydrocarbon fuels.

SUMMARY OF THE INVENTION

The present invention provides a method and apparatus for air-oxygen-fuel combustion to increase productivity while minimizing NOX formation. Oxy-fuel combustion takes place in a post-mix or nozzle-mix burner. Air is introduced around the oxy-fuel combustion so that the air is directed along what would be a longitudinal axis of the oxy-fuel flame at an angle between slightly greater than 0° to 90° to the axis of the oxy-fuel flame. In the preferred embodiment of the invention the velocities of air, oxygen and fuel are the same with each being less than two hundred feet per second (200 fps).

BRIEF DESCRIPTION OF THE DRAWING

FIG. 3 is a longitudinal schematic cross section of an alternate embodiment of the present invention.

DETAILED DESCRIPTION OF THE INVENTION

It has been shown that thermal efficiency of air-fuel combustion processes can be improved by the use of oxygen enrichment techniques. To this end, the process described in U.S. Pat. No. 5,308,239, the specification of which is incorporated herein by reference, has provided industry with a method for retrofitting conventional air-fuel processes to take advantage of oxygen enrichment techniques.

Figure 2:
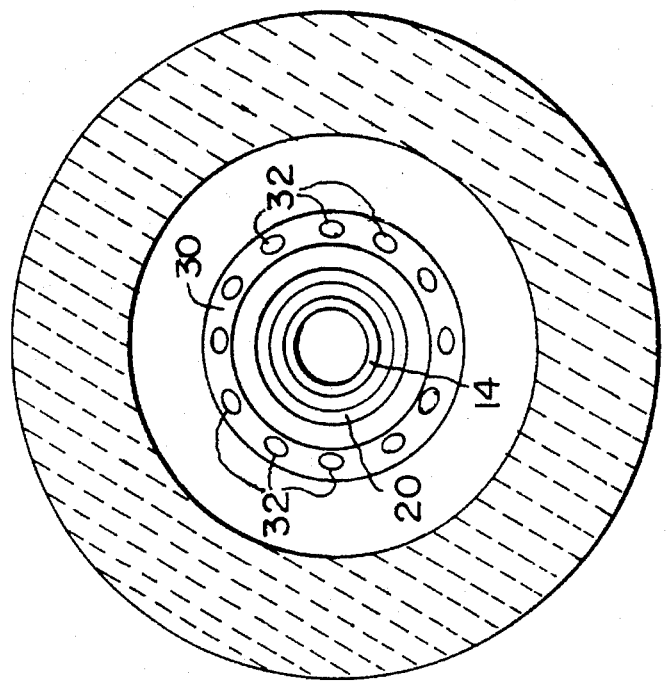
FIG. 2 is view taken along line 2—2 of FIG. 1.
Figure 1:
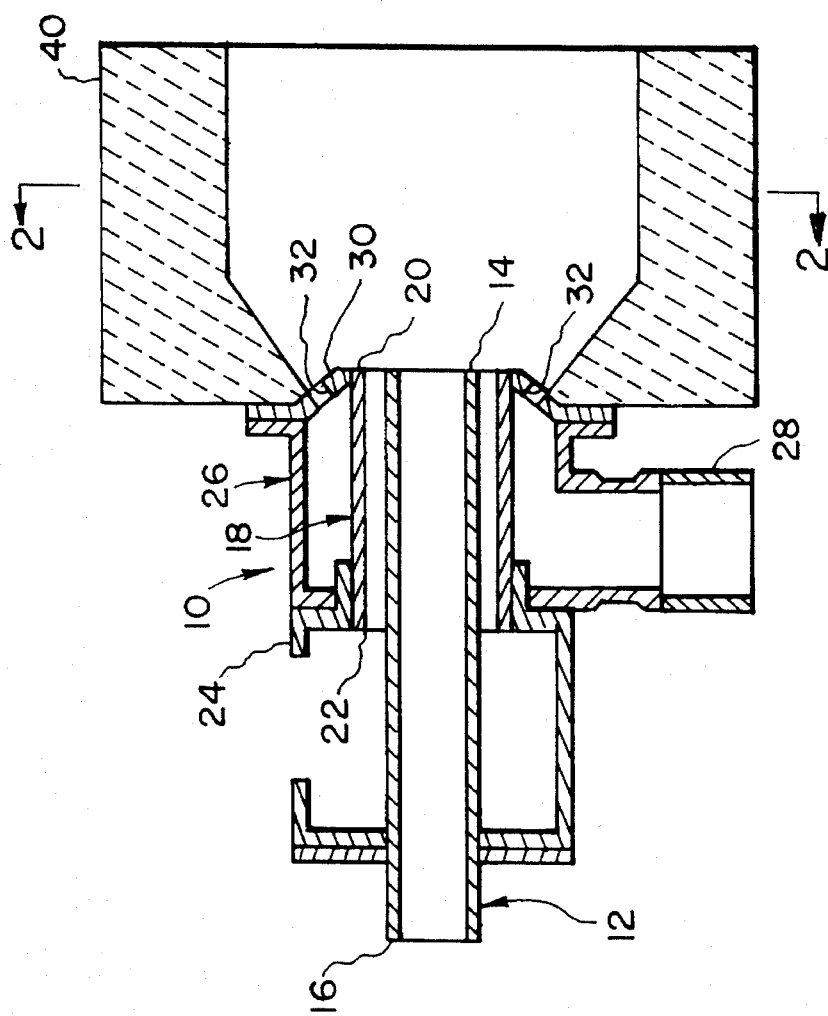
FIG. 1 is a longitudinal schematic cross-section of an apparatus according to the present invention.

Referring to FIG. 1, a burner shown generally as 10 according to the present invention includes a central fuel conduit 12 having a first or combustion end 14 and a second or fuel supply end 16. Conduit 12 is surrounded by a concentric conduit 18 having a first or combustion end 20 and a second end 22 which communicates with an oxygen supply manifold 24 as is well known in the art. As shown in FIG. 2, the conduit 12 and the conduit 18 are generally concentric to each other and define at their combustion ends 14 and 20 a post mix or nozzle mix oxy-fuel burner nozzle or outlet.

Disposed around the oxy-fuel conduit 18 is an air-fuel chamber or a passage 26 which communicates with an air manifold 28 for introducing air into the chamber 26. The forward end of chamber 26 terminates in a face plate 30 which contains a plurality of equally spaced air passages 32. Plate 30 is disposed at an angle to the longitudinal axis of the fuel conduit 12 so that air introduced through fitting 28 into chamber 26 exits through holes 32 at an angle to the longitudinal axis of the fuel conduit and therefore the oxy-fuel burner. Preferably, the angular relationship of the axis of the holes 32 and the axis of oxy-fuel burner is greater than 0° and up to 90°. The burner 10 can be disposed in a burner block 40 so that the burner can be readily mounted in a furnace. However, as will be more fully explained hereinafter, the burner block is not necessarily required.

Thus, in its basic form, the present invention permits the combustion of an oxy-fuel flame which is surrounded by air so that the total oxygen supply is through a combination of pure oxygen and the oxygen contained in the air, the process of the invention reducing the total amount of NO produced by the combustion process.

In the burner and the process according to the '239 patent, it was found that by increasing the fuel supplied to the oxy-fuel portion of the burner and passing less fuel through the air-fuel portion produced the lowest amount of NOX. A burner according to FIGS. 1 and 2 herein improved the ability to lower the NOX by completely eliminating the fuel for the air-fuel portion. In addition, the introduction of the air in a different manner yielded lower fuel, oxygen and air velocities which further reduced the NOX by as much as 80% in comparison to the burner of the '239 patent.

According to the present invention, it was found that the overall oxygen to fuel ratio should be at or near stoichiometric. The actual ratio depends on several factors. In a process which has a large amount of air infiltration, the ratio should be on the fuel-rich side to minimize NOX without producing too much carbon monoxide. In a process where oxidation of the product is a concern, the ratio should be fuel rich even where there is air infiltration. Any unburned fuel like carbon monoxide, can be post-combusted to avoid unacceptable emissions in the exhaust stack. In a process where fuel may be liberated, such as in waste incineration, the ratio may be more on the fuel lean side to provide sufficient oxidizer to burn the extra fuel, if air infiltration to the process is insufficient. In general, it is desired to operate burners according to the present invention as close to the stoichiometric ratio as possible to minimize NOX emissions without creating a problem with carbon monoxide and combustibles emissions.

According to the present invention, the total oxygen enrichment level should be greater than 40%. Operating the burner between 25 and 40% enrichment would be undesirable and operation below 25% enrichment would probably not be economical because the small amount of oxygen would provide few process benefits, increase NOX compared to air-fuel only operation, and add to equipment and maintenance costs. As a general principle for a combustion system operating above 40% oxygen enrichment, the higher the enrichment level, the lower the NOX production. A series of tests were run in a furnace approximately 17 feet long, 7 feet wide and 6.5 feet high. The floor of the furnace was made of refractory bricks, with the end walls, lower sidewalls and roof lined with a high temperature ceramic fiber blanket. The upper sidewalls of the furnace were filled with water to simulate a furnace load. The furnace contained a flue in one end wall approximately 20 inches in diameter with a water cooled damper to control furnace pressure. The burner was centered approximately in the other end wall.

NOX was measured with a Beckman model 865 non-dispersive infrared analyzer. Carbon monoxide and carbon dioxide were measured with Beckman model 864 non-dispersive infrared analyzers. Oxygen was measured with a Taylor-Servomex model 08.244 paramagnetic analyzer. Nitrogen and carbon monoxide were also measured with a Hewlett Packard gas chromatograph. Gas samples were extracted from the flue with a vacuum pump through a stainless steel water cooled probe. These samples were immediately cooled with a condenser to remove most of the water from the gases and the samples were transported through Teflon tubing for further drying with a desiccant and a membrane dryer before being injected into the analyzers. Sample dew points were generally below 0° F. indicating a very dry sample.

The oxygen used for the test was 99.5% minimum purity. The natural gas used as a fuel had a composition by volume of 94.28% $CH_4$, 3.04% $C_2H_6$, 0.83% $C_3H_8$, 0.34% $C_4H_{10}$, 0.12% $C_5H_{12}$, 0.06% other hydrocarbons, 0.49% $N_2$, 0.82% $CO_2$. For this fuel, the higher heating value is about 1032 Btu/ft$^3$. For this composition, the theoretical stoichiometry for perfect combustion, (based on total oxygen from air and oxygen streams) is about 2.04. In this context stoichiometry is based on the volume flow of oxygen, (air+$O_2$) in the oxidizer divided by the volume flow of natural gas.

The burner of the '239 patent was simulated by replacing the oil nozzle of a North American model 6514 dual fuel burner with an oxy-fuel burner. The oil nozzle was removed, and an oxy-fuel burner was inserted through the middle of the model 6514burner. The burner according to the present invention was as shown in FIG. 1. Table 1 below sets forth a typical set of operating conditions along with NOX results for a burner operating according to the '239 patent and according to the present invention.

TABLE 1

| Parameter | '239 BURNER | FIG. 1 BURNER |
|---|---|---|
| overall equivalence ratio | 0.890 | .88 |
| overall oxygen enrichment level (vol %) | 51 | 46 |
| overall firing rate (MMBtu/hr) | 2.5 | 2.5 |
| furnace pressure (in. H20) | 0.05 | 0.05 |
| average furnace temp. (deg F.) | 2385 | 2070 |
| NOx (lb/MMBtu) | 0.514 | 0.096 |

Under similar firing conditions, the burner according to the present invention produced significantly less NOX than the burner according to the prior art. It was also observed that the flame produced by the burner according to the present invention was much larger and more luminous than the prior art burner.

It is believed that the burner of the present invention produced lower NOX than the prior art burner because of the use of only three gas passages instead of four coupled with the arrangement of the gas passages in the new burner. In the prior art there are three reaction zones (sometimes referred to as flame fronts or flame sheets). These are at the interface of the fuel and oxygen passages in the oxy-fuel portion, at the interface of the fuel and air passages in the air-fuel portion and in the interface between the oxygen of the oxy-fuel and the fuel of the air fuel portions. In the burner according to the present invention, there is only one reaction zone which is between the fuel and oxygen passages. These reaction zones are where the fuel is reacted when the mixture concentration of the fuel and oxidant is in the flammable range. It is believed that this is where much of the NOX is formed due to the higher temperatures at these locations. It is also possible that the lower NOX is produced with the burner according to the invention because of the shielding of the air by the oxygen. It is believed that the oxygen in the burner according to the present invention acts as a shroud to keep nitrogen in the air supply from quickly mixing with the fuel thus keeping nitrogen out of the hotter part of the flame which in turn helps to reduce the formation of NOX.

It should be stressed that one of the key features of the present invention is that the gas velocities should be low and as close to equal as possible. The use of low velocities of equal measure minimizes mixing and stretches out the flame making the flame more uniform in temperature without high peak flame temperatures that are common in conventional air-oxygen-fuel of burners (e.g. U.S. Pat. Nos. '239, '363 and '087).

According to the present invention, the maximum benefits in reducing the formation of NOX are achieved when the velocity of the air, the velocity of the natural gas and the velocity of the oxygen are approximately equal and less than 200 feet per second. Introducing the air through a plurality of apertures or passages, approximately 12 in number, also aids in achieving the maximum benefit of the invention.

Further tests were conducted on alternate embodiments of the invention. FIG. 3 shows a burner 49 containing a central fuel conduit 50 surrounded by an oxygen conduit 52 having a flare deflector 54 in the shape of a truncated cone whose sides are at an angle approximately 45° to the center line of the burner. Surrounding the oxy-fuel burner 50,52 is an air conduit 56. Fuel, e.g. natural gas is introduced to the conduit 50 via fitting 51, oxygen is introduced to conduit 52 via fitting 53 and air is introduced to conduit 56 via fitting 57. A burner 49 according to FIG. 3 was fabricated using stainless steel piping and fittings. The fuel passage 50 was fabricated from a 2.5 inch schedule 80 pipe (2.323 inches id by 2.875 inches od). The oxygen conduit 52 was a four inch schedule 40 pipe (4.026 inches id by 4.500 inches od) and the air conduit 56 was a 6 inch schedule 40 pipe (6.065 inch id by 6.625 inch od). The flare 54 in the version shown in FIG. 3 projected one inch beyond the end of the burner 59.

Figure 4A:
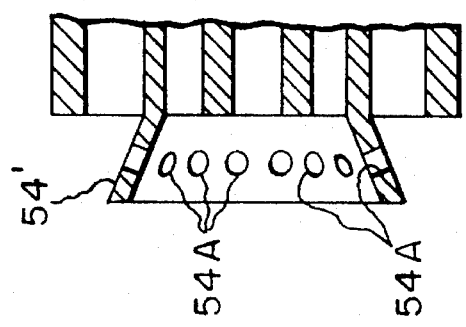
FIG. 4A is a longitudinal schematic cross section an alternate embodiment of the flare deflector portion of FIG. 4.
Figure 4:
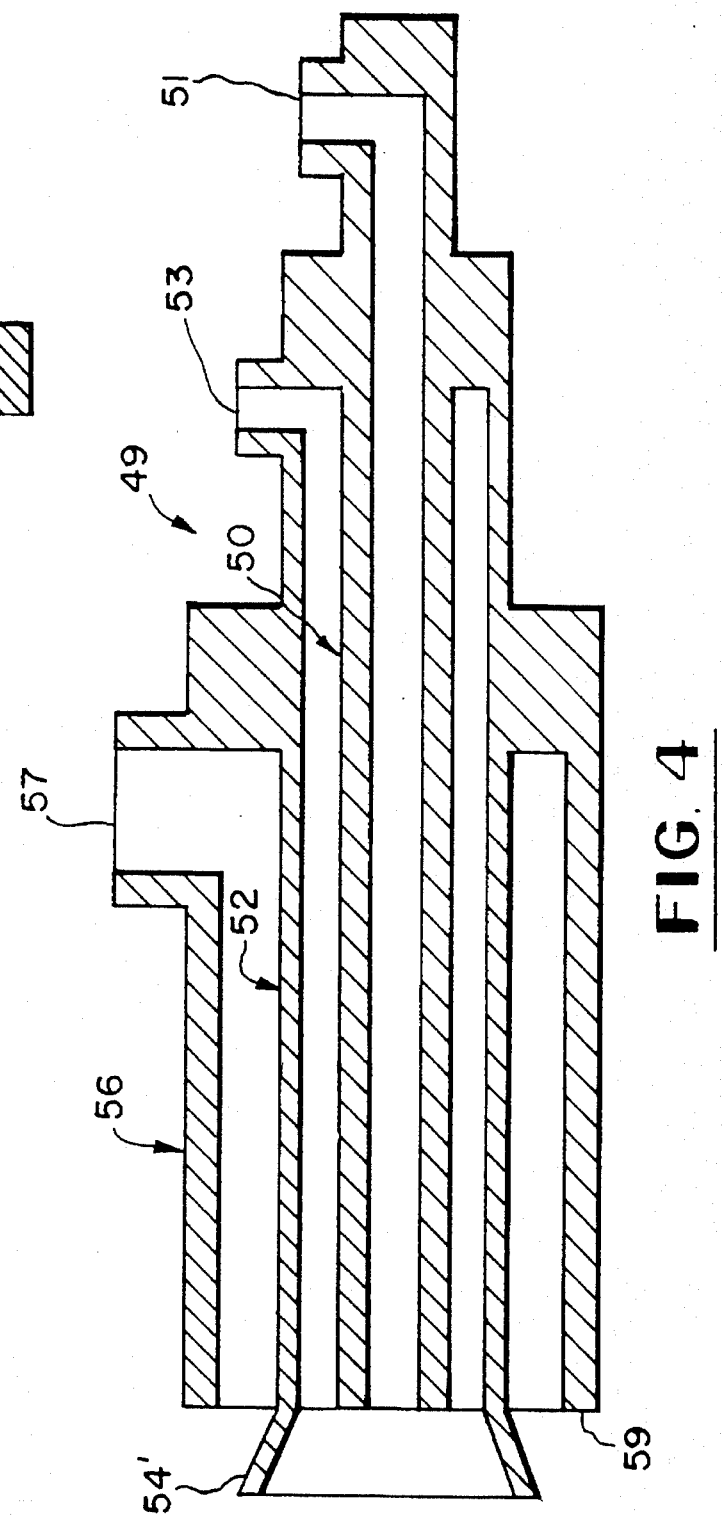
FIG. 4 is a longitudinal schematic cross section of another embodiment of the present invention.

FIG. 4 is a burner that is identical in dimensions to the burner of FIG. 3 except that the flare 54' only projects one half inch beyond the end 59 of the burner 49.

Figure 5:
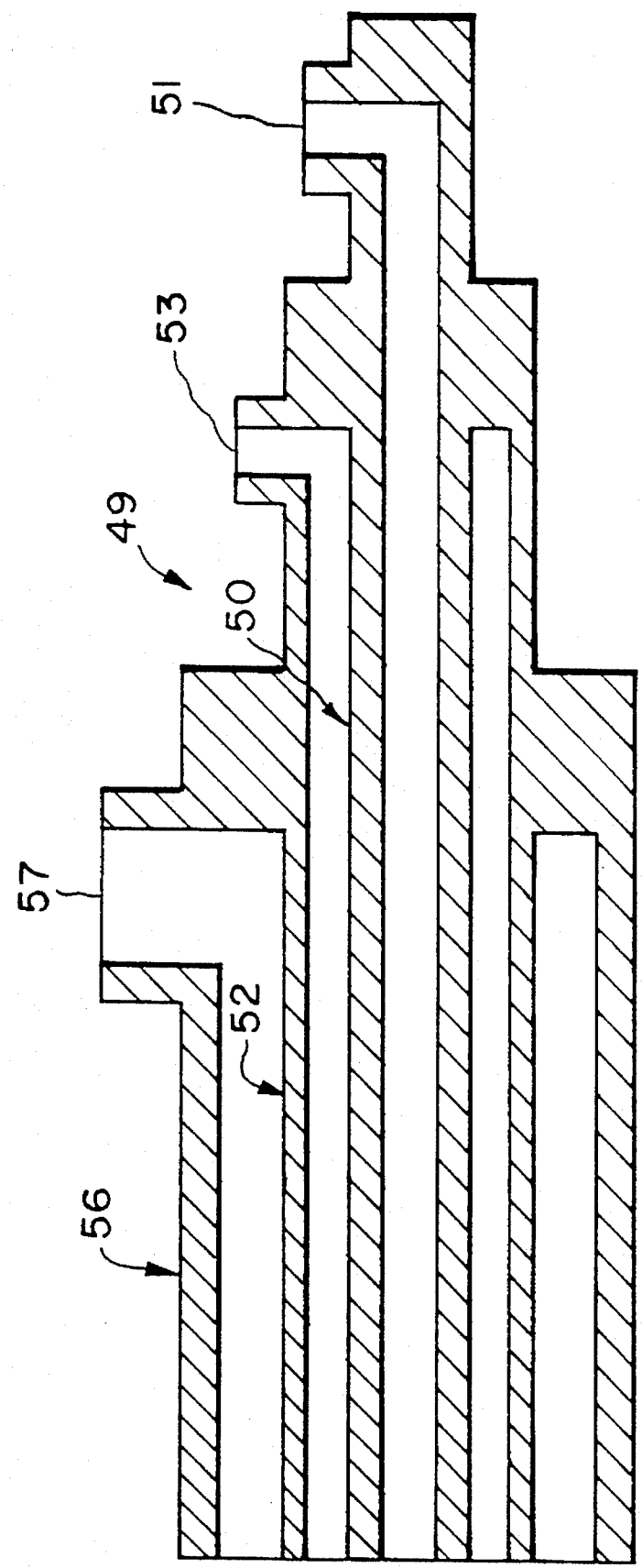
FIG. 5 is a longitudinal schematic cross section of a burner used in comparative testing of the method and apparatus of the present invention.

FIG. 5 is a schematic representation of the burner 49 of FIGS. 3 and 4 without the flare.

The burners of FIGS. 3, 4, and 5 were designed, fabricated and tested for firing at a rate of 3 million Btu per hour with an oxidizer (air plus oxygen) containing 46.5% oxygen and gas (air, oxygen, natural gas) velocities of about 25 feet per second.

A burner according to FIG. 3 was fired in the test furnace at the rate of 3 million Btu per hour with an oxygen to natural gas stoichiometry in the range of 2.3 to 2.5, a furnace pressure in the range of −0.07 inches to 0.07 inches water column and an oxygen enrichment in the range of 30 to 80%. Oxygen enrichment is defined as:

$$O_2 \text{ enrichment} = \frac{\text{total volume of } O_2 \text{ supplied through the burner}}{\text{total volume of } O_2 + N_2 \text{ supplied through the burner}}$$

The carbon monoxide level ranged from 100 ppm to greater than 5000 ppm. For the purposes of these tests, ppm refers to parts per million by volume on a dry basis. Most of the data were taken at a furnace pressure of about 0.05 inches water column and an oxygen to natural gas stoichiometry of 2.4. The stoichiometry was intentionally maintained at a high level because the burner produced a black soot at lower stoichiometries. Production of soot at the test site is prohibited.

Figure 6:
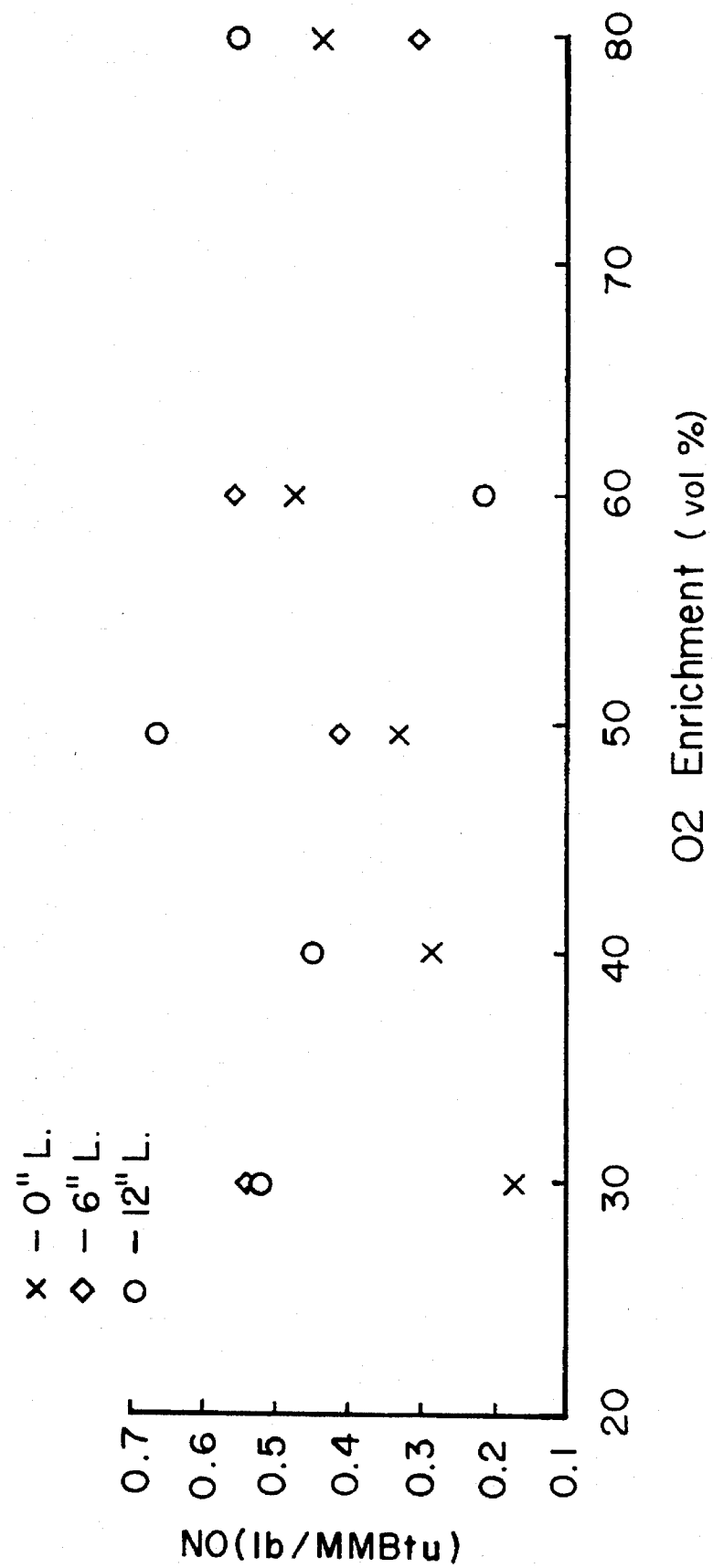
FIG. 6 is a plot of oxygen enrichment against NO produced when testing the burner of FIG. 3.

FIG. 6 is a plot of oxygen enrichment against NO produced wherein the burner was employed with a burner block such as shown in FIG. 1 having a length of 0 inches (no burner block) six inches and twelve inches measured from the end of the burner. FIG. 6 shows that NO levels were lowest where no burner block was used and at the lowest enrichment of 30%.

Figure 7:
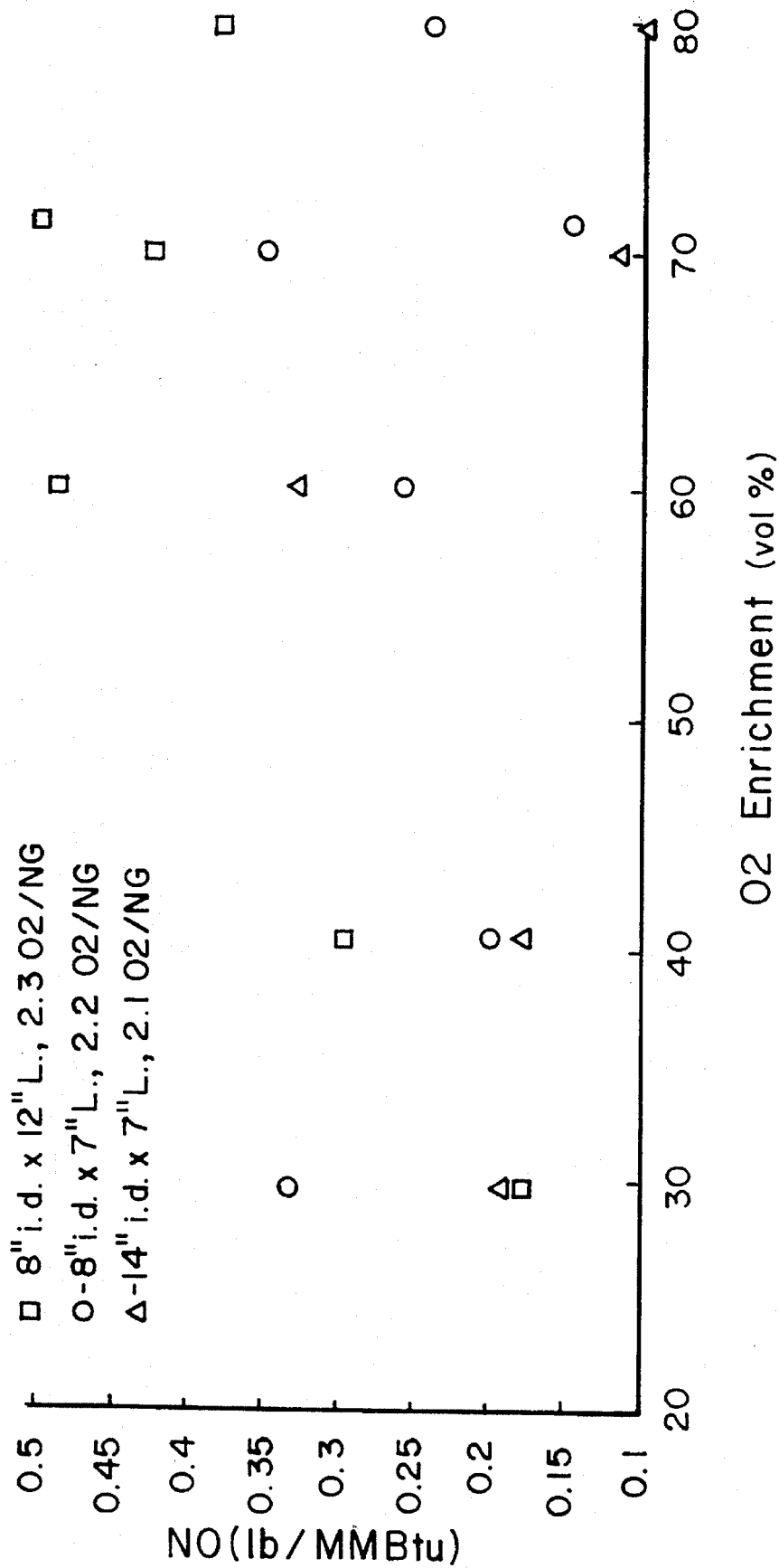
FIG. 7 is a plot of oxygen enrichment against NO produced when testing the burner of FIG. 4.

A second set of data was collected using a burner such as shown in FIG. 4 fired at rates ranging from 3.0 to 5.0 million Btu per hour with a stoichiometry ranging from 1.6 to 2.5 $O_2$/natural gas. The furnace pressure was about 0.05 inches water column and the oxygen enrichment ranged from 30 to 80%. FIG. 7 shows the results of the data taken where the burner was fired in burner blocks having the dimensions shown. As shown in FIG. 7, NO production increased with oxygen enrichment. The burner block having a 14 inch inside diameter and a 7 inch length generally produced the lowest amount of NO. In general, the wider or shorter burner block produced less NOX. Comparing FIGS. 6 and 7, the burner of FIG. 4 produced less NOx than the burner of FIG. 3.

Figure 8:
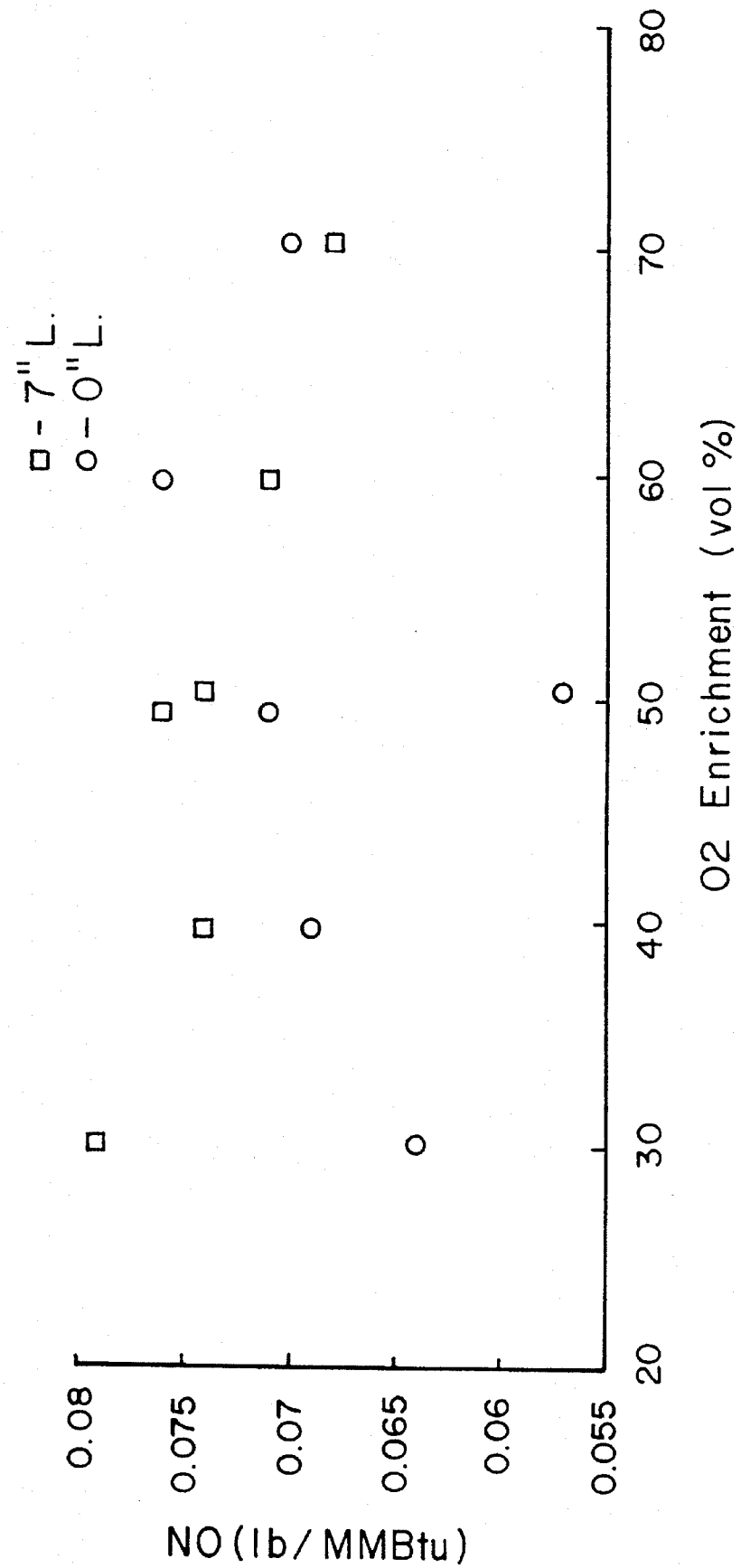
FIG. 8 is plot of oxygen enrichment against NO produced when testing a modified burner of FIG. 4.

The burner of FIG. 4 was modified by drilling a series of 17 0.5 inch diameter holes equally spaced around the conical portion of the flare as illustrated in FIG. 4A. The burner was fired at 3 million Btu per hour and a furnace pressure of about 0.05 inches water column. The results of these tests are plotted in FIG. 8 wherein the burner was fired with a stoichiometry of about 1.7. The NO level for the burner fired without a burner block (0 inches L) which was as low as 0.057 lbs. per million Btu was generally lower than that for the burner fired with the 7 inch long burner block. Again, NO increased as the oxygen enrichment decreased. Due to the fact that the burner block was fairly wide (14 inches id) there was not as much difference in the NOX for the burner fired without a block as opposed to the use of a 7 inch burner block although in general no other burner block again produced less NOX. The NOx levels in FIG. 8 are very low because the burner could be fired at a stoichiometry of 1.7 without producing excessive soot. This is due to the increased mixing of the fuel and oxygen caused by the holes in the flair cone.

Figure 9:
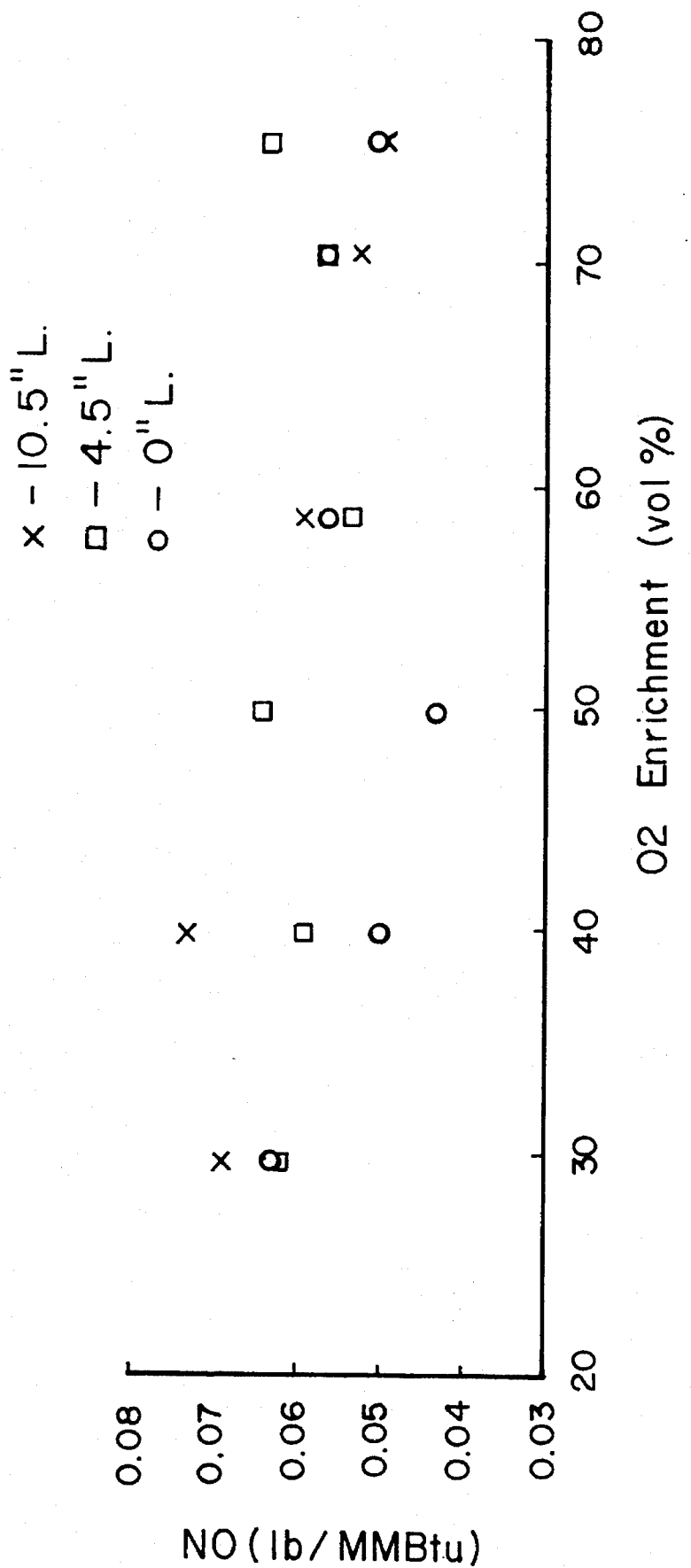
FIG. 9 is a plot of oxygen enrichment against NO produced when testing the burner of FIG. 5.

A final set of data was collected utilizing the burner of FIG. 5 wherein the burner was fired at a rate of 3 million Btu per hour, a furnace pressure of 0.05 inches water column, oxygen enrichment ranging from 30 to 80% and a stoichiometry ranging from 1.6 to 2.5 oxygen/natural gas. FIG. 9 compares NO produced utilizing three different burner block configurations with a stoichiometry of approximately 1.6. As shown in FIG. 7, the NO produced was lowest when no burner block was used. The lowest NO produced was about 0.04 lbs. NO/MMBtu. At that stoichiometry, all NO measurements were low. Again, as shown in FIG. 7, firing the burner without a burner block generally produced less NOX than with a burner block being used.

Figure 10:
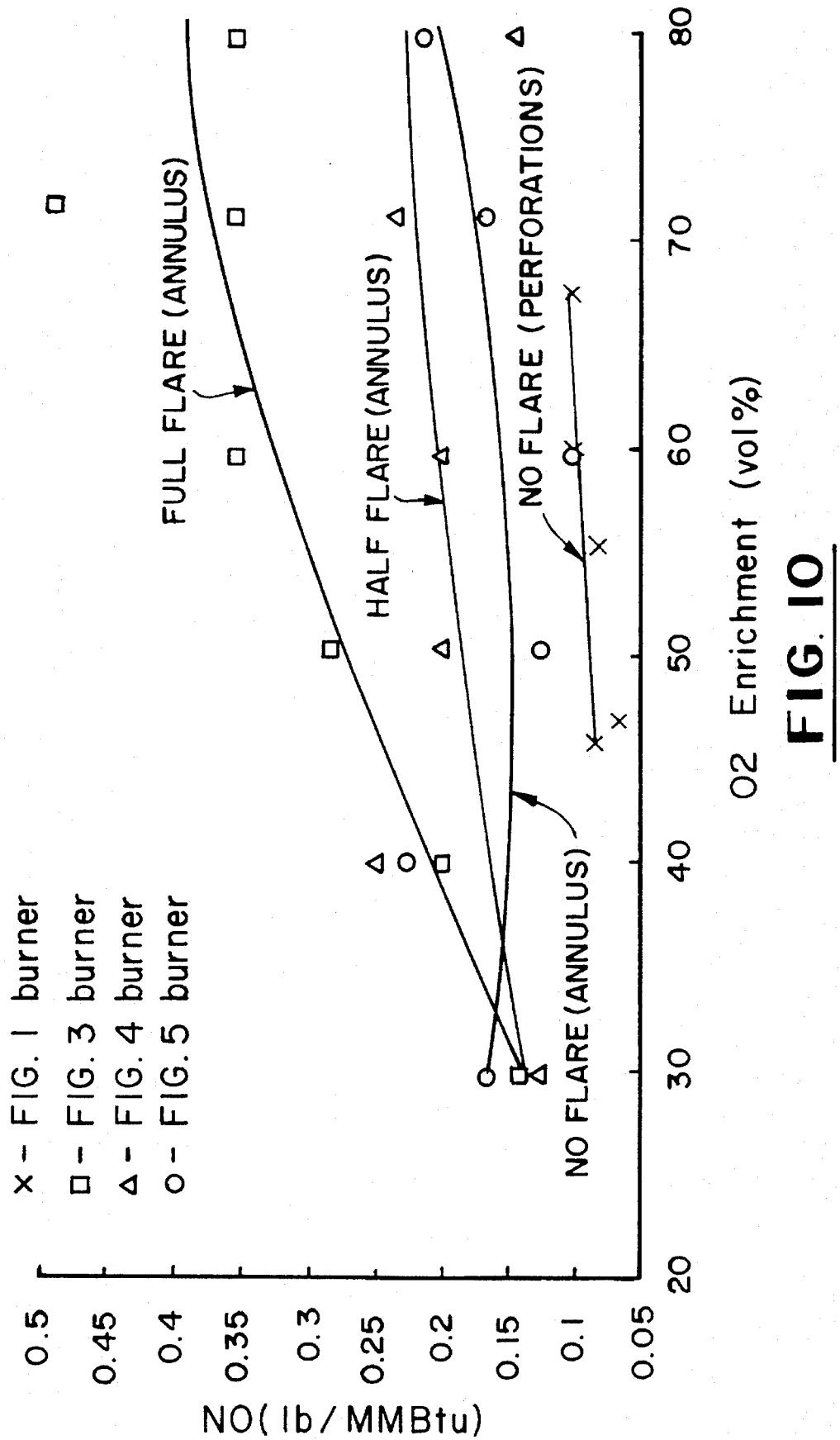
FIG. 10 is plot of oxygen enrichment against NO produced for the burners of FIGS. 3, 4 and 5 fired without use of a burner block.

FIG. 10 compares the production of NO for the burners shown in FIGS. 1, 3 (full flare), FIG. 4 (half flare) and FIG. 5 (no flare) fired at 3 million Btu per hour and a stoichiometry of 2.3. For the comparison of FIG. 10, the full flare FIG. 3 burner was fired at a furnace pressure of 0.01 inches water column, the half flare (FIG. 4) burner with holes was fired at a furnace pressure of 0.05 inches water column and the no flare (FIG. 5) burner was fired under a furnace pressure of 0.05 inches water column. As shown in FIG. 10, the burner of FIG. 5 generally produced the lowest NO, regardless of the differences in furnace pressure. For burners of the type shown in FIGS. 3, 4, and 5 NO began to decline about 40% oxygen for the half flare and no flare burners. According to adiabatic equilibrium predictions, that is about how the NOX curve would look. For the burner of FIGS. 1 and 2, the NO began to decline at levels of about 30% oxygen. The burners of FIGS. 3, 4 and 5 would probably be operated in a commercial application by setting the stoichiometry at about 1.5. This is because air infiltration generally increases the effective stoichiometry and because the industrial user, (e.g. aluminum melter) does not want to oxidize any of the molten metal in the furnace which would in turn lower production yields. The burners could not be run in the test furnace at a stoichiometry of 1.5 because of the production of a very smokey/sooty exhaust. In an aluminum melting furnace, for example, it would be a longer residence time and enough ambient air leakage both into the furnace and into the exhaust stack so that the exhaust to the atmosphere would not be smokey/sooty. According to the test discussed above, burners with a full flare and with a half flare (no holes) produced very sooty flames. These burners had to be run at a stoichiometry of about 2.3 to avoid producing excessive smoke/soot and exhaust. The burners with the half flare (with holes) and no flare could be run at stoichiometry as low as 1.6 without causing excessive smoke or soot. Burners run without a burner block generally produced less NOX than those same burners run with a burner block. Shorter and wider burner blocks produce less NOX than longer and narrower blocks. Introducing holes into the flare reduced the NOX in comparison to the flare with no holes. No flare on the burner produced the least amount of NOX. All of the burners of FIGS. 3, 4 and 5 produce less NOX than the burner of the '239 patent but produce more NOX than the burner shown in FIGS. 1 and 2.

The key benefit of the method and apparatus of the present invention is the lowered NOX production when the burner is in use. This is achieved by a burner using fixed nozzles having the specified angular relationships, introducing the air as a plurality of streams around the oxy-fuel flame and matching the velocities of air, oxygen and fuel preferably at values below 200 fps.

Having thus described our invention, what is desired to be secured by Letters Patent of the United States is set forth in the appended claims.

What is claimed:

1. A method for reducing nitrogen oxide production during the combustion of an air-oxygen-fuel mixture comprising the steps of:

creating an oxygen-fuel post or nozzle mix flame at an exit end of a fuel supply conduit surrounded by an exit end of an oxygen supply conduit;

surrounding said oxygen-fuel flame with air said air supplied around said flame as a plurality of streams surrounding said flame at an angle to a center line of said flame of about 450; and maintaining combustion with a total oxygen to fuel ratio of between about 1.5 and about 2.6.

2. A method according to claim 1, wherein said fuel, said oxygen and said air are delivered to an enclosed space at substantially identical velocities.

3. A method according to claim 2 wherein said velocities are less than 200 ft/sec.

4. A method according to claim 1 including using said oxygen-fuel mixture and said air surrounding said oxygen-fuel mixture to produce a flame inside of a burner block.

5. A method according to claim 1 including effecting said combustion with an air-oxygen mixture containing about 30 to 80% oxygen.

6. A method according to claim 1 wherein said oxygen to fuel ratio is controlled to suppress formation of soot in the flame.

7. An air-oxygen-fuel burner comprising in combination:

a central fuel conduit having an entry end and a discharge end;

an oxygen conduit surrounding said fuel conduit said oxygen conduit having an entry end and a discharge end said discharge end of said oxygen conduit terminating in a same plane and concentric with the discharge end of said fuel conduit;

means to deliver air in a plurality of streams around said discharge end of said oxygen conduit;

means in said means to deliver air adapted to direct air at an angle to a center line of said oxygen passage of greater than 0° up to 90° into an oxy-fuel mixture produced by introducing fuel into said fuel conduit and oxygen into said oxygen conduit wherein said means to direct air is a generally conical shaped deflector disposed around the discharge end of said oxygen conduit, said deflector containing a plurality of holes disposed equally around said deflector.

8. A burner according to claim 7 wherein said deflector has seventeen holes disposed equally around a conical wall of said deflector.

9. A burner according to claim 7 wherein said means to direct air is defined by a wall containing a plurality of equally spaced holes around the discharge end of said oxygen conduit.

10. A burner according to claim 9 wherein said means contains twelve holes.

* * * * *